Patented Apr. 25, 1939

2,155,961

UNITED STATES PATENT OFFICE 2,155,961

METAL SALTS OF SULPHONATED TERPENE-PHENOL CONDENSATES AND METHOD OF PREPARATION THEREOF

William W. Trowell, Wilmington, Del., assignor to Hercules Powder Company, Wilmington, Del., a corporation of Delaware No Drawing. Application January 19, 1938, Serial No. 185,698

11 Claims. (Cl. 260—448)

This invention relates to water-insoluble metal salts of sulphonated terpene-phenol condensates and method of preparation thereof.

Sulphonated terpene-phenol condensates are known, as well as alkali salts thereof, as disclosed in Segessemann Patent No. 2,054,140.

I have found that the water-insoluble metal salts of sulphonated terpene-phenol condensates, not heretofore known, are new and useful products, for example in the production of non-slip finishes for textiles.

In the preparation of my product I may use as the terpene compound pinene, pine oil, turpentine, terpineol, borneol, fenchyl alcohol, terpin, terpin hydrate, dipentene, etc., and as the phenol, phenol, a substituted phenol, a cresol, a substituted cresol, a naphthol, etc. As the sulphonating agent I may use sulphuric acid, fuming sulphuric acid, sulphur trioxide, chlorosulphonic acid, etc. I make no claim to sulphonated terpene-phenol condensates. As the metals used in the production of the water-insoluble metal salts in accordance with this invention, I may use aluminum, zinc, magnesium, calcium, iron, cobalt, nickel, etc.

In the preparation of my water-insoluble metal salts of sulphonated terpene-phenol condensates, the sulphonated terpene-phenol condensate is reacted with a water-soluble heavy metal salt, preferably at an elevated temperature, to facilitate reaction, and preferably in aqueous solution, and the precipitate, comprising said water-insoluble salt of a sulphonated terpene-phenol condensate, is filtered, washed with water, and dried.

As specific illustrations of the product and process in accordance with this invention, the following examples are given:

Example I

Two parts by weight of basic aluminum acetate dissolved in 40 parts by weight of water are added to 2 parts by weight of sulphonated pinene-cresol condensate dissolved in 56 parts by weight of water at 60° C., the mixture stirred and heated for 5 minutes at 80° C. The precipitate, comprising the aluminum salt of the sulphonated terpene-cresol condensate, is filtered, washed with water, and dried for 15 minutes at 150° C. The salt is light in color, water-insoluble and water-resistant.

Example II

Three parts by weight of basic aluminum acetate dissolved in 40 parts by weight of water, acidified with 0.5% of acetic acid, is added to 4 parts by weight of sodium sulphonate of pinene-cresol condensate dissolved in 53 parts by weight of water at 40° C., the mixture stirred and heated for 10 minutes at 85° C. The precipitate, comprising the aluminum salt of a sulphonated pinene-cresol condensate, is treated as in Example I.

Example III

Two parts by weight of nickel acetate dissolved in 40 parts by weight of water are added to 2 parts by weight of sulphonated pinene-cresol condensate dissolved in 56 parts by weight of water at 30° C., stirred, and heated for 5 minutes at 80° C. The precipitate, comprising the nickel salt of sulphonated pinene-cresol condensate, is treated as in Example I.

Example IV

One part by weight of cobalt acetate dissolved in 10 parts by weight of water at 60° C. is added to 2 parts by weight of the sodium salt of sulphonated pinene-phenol condensate dissolved in 40 parts by weight of water at 60° C., stirred and heated for 10 minutes at 60° C. The cobalt salt of the sulphonated terpene-phenol condensate comprises the precipitate, and is treated as in Example I.

The water-insoluble metal salts of sulphonated terpene-phenol condensates are useful in applying to textile fabrics in the form of lacquer emulsions or in solution in a solvent, such as ethyl alcohol, to impart to the textile fabric a non-slip finish.

What I claim and desire to protect by Letters Patent is:

1. A water-insoluble metal salt of a sulphonated condensate of a terpene and a phenol.

2. An aluminum salt of a sulphonated condensate of a terpene and a phenol.

3. A water-insoluble metal salt of a sulphonated condensate of a terpene and cresol.

4. A water-insoluble metal salt of a sulphonated condensate of pinene and a phenol.

5. An aluminum salt of a sulphonated condensate of pinene and phenol.

6. Method of preparation of a water-insoluble metal salt of a sulphonated condensate of a terpene and a phenol including reacting a water-soluble heavy metal salt with a water-soluble sulphonated condensate of a terpene and a phenol and recovering the water-insoluble metal salt of said sulphonated condensate of a terpene and a phenol.

7. Method of preparation of a water-insoluble metal salt of a sulphonated condensate of a terpene and a phenol including reacting a water-soluble heavy metal salt with a water-soluble sodium salt of a sulphonated condensate of a terpene and a phenol and recovering the water-insoluble metal salt of said sulphonated condensate of a terpene and a phenol.

8. A water-insoluble metal salt of a sulphonated condensate of a terpene and phenol.

9. An aluminum salt of a sulphonated condensate of a terpene and cresol.

10. An aluminum salt of a sulphonated condensate of pinene and cresol.

11. An aluminum salt of a sulphonated condensate of pinene and a phenol.

WILLIAM W. TROWELL.